S. A. BARRICKMAN.
STEAM LOCOMOTIVE.
APPLICATION FILED JAN. 4, 1910.
972,790.
Patented Oct. 11, 1910.
2 SHEETS—SHEET 1.
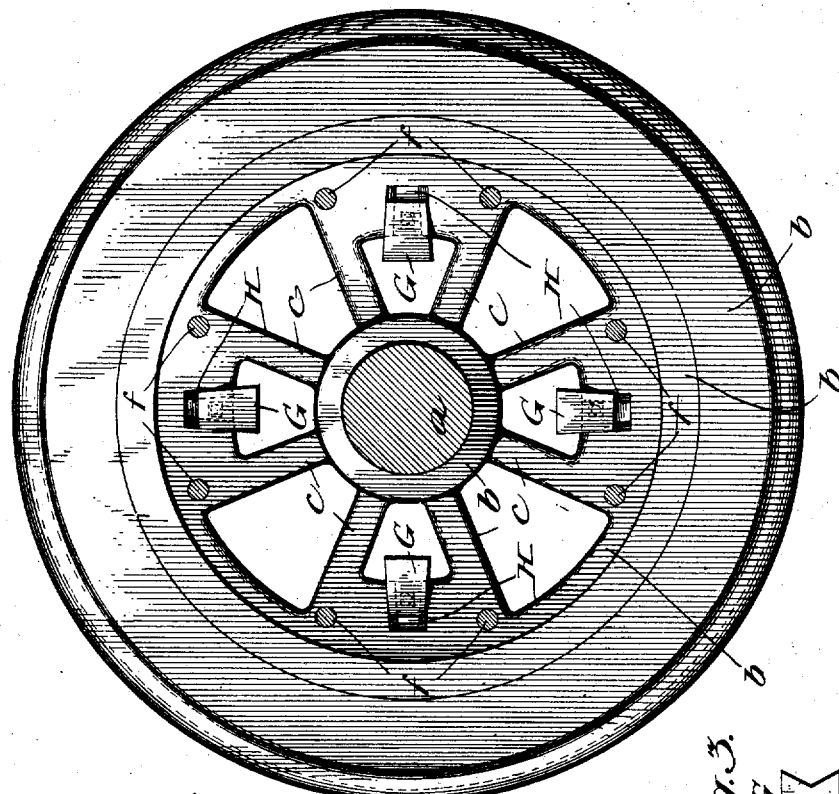
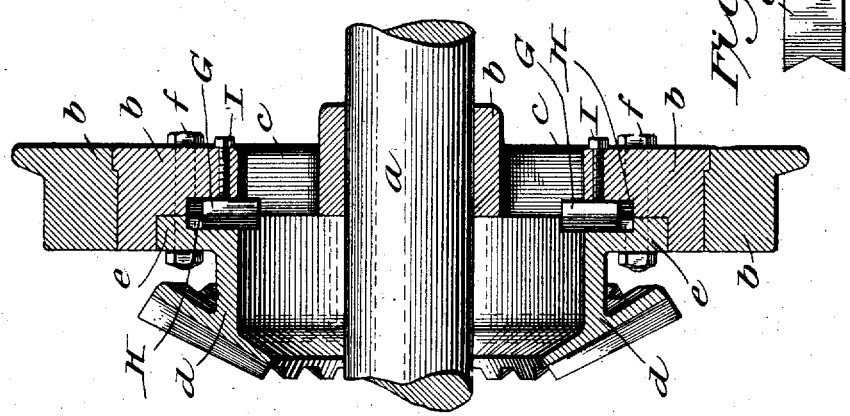

S. A. BARRICKMAN.
STEAM LOCOMOTIVE.
APPLICATION FILED JAN. 4, 1910.

972,790.

Patented Oct. 11, 1910.
2 SHEETS—SHEET 2.

Witnesses:
Harry L. Barrickman
J. J. McCoy

Inventor:
Sylvester A. Barrickman

UNITED STATES PATENT OFFICE.

SYLVESTER A. BARRICKMAN, OF RICHWOOD, WEST VIRGINIA.

STEAM-LOCOMOTIVE.

972,790.  Specification of Letters Patent. Patented Oct. 11, 1910.

Application filed January 4, 1910. Serial No. 536,369.

*To all whom it may concern:*

Be it known that I, SYLVESTER A. BARRICKMAN, a citizen of the United States, residing at Richwood, in the county of Nicholas and State of West Virginia, have invented certain new and useful Improvements in Steam-Locomotives, fully described and represented in the following specification and accompanying drawings.

My invention relates to beveled-cog drive-wheels and universal shaft-couplings, such as are employed in the locomotive engine improved by Shay (Letters Patent No. 242,992, June 14, 1881), Wall and Feightner (Letters Patent No. 893,041, July 14, 1908), and others.

The object of my invention is to overcome the wear and tear in such wheels and couplings as now manufactured, caused by the shearing of the parts, which shearing, when the engine is in operation, soon cuts the bolts off at the points where the bolted parts join each other, being the points where the shearing takes place, distorts and enlarges the bolt-holes, necessitates new bolts, the drilling of new holes in the parts, and, in a short time, new parts; and destroys the cupping or bushing in which work the lugs of the coupling-yokes. I attain these objects by means of tapering wedges of steel, of uniform shape and size, containing dove-tailed grooves, one in either edge of each wedge, running its entire length, and corresponding mortises cut in the respective parts now secured together with bolts, one-half of each mortise being cut in each respective piece; which wedges, being driven into said mortises, are held firmly in place by means of their own friction and by means of set-screws, all of which are illustrated in the accompanying drawings, in which—

Figure 4:
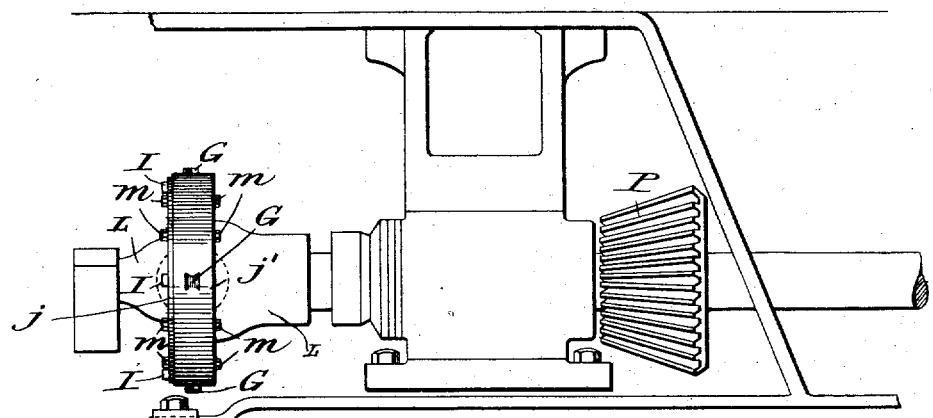
Figure 5:
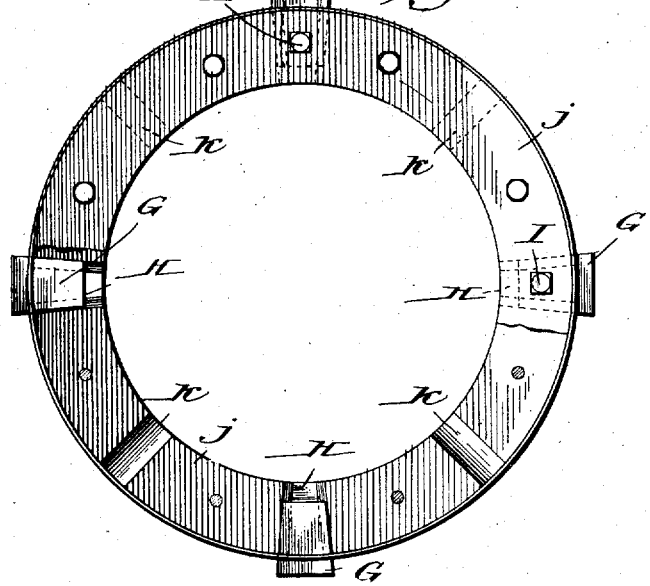
Figure 6:
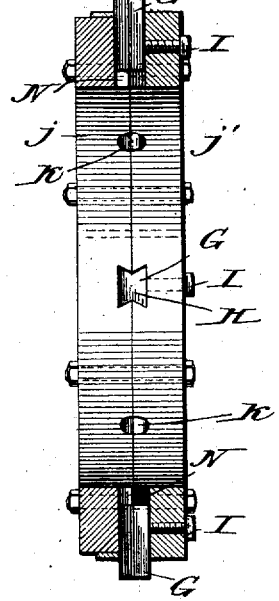

Figure 1. is a partly sectional elevation of a drive-wheel of a locomotive engine, with beveled-cog gear-wheel secured to the outside of said drive-wheel; Fig. 2. is a side elevation of the outside of the drive-wheel with the beveled-cog gear-wheel removed, showing one-half of each of four wedges in place in the mortises in the main drive-wheel body; Fig. 3. is an end view of the wedge; Fig. 4. is a side elevation of a universal shaft-coupling joint, such as is employed in a Shay engine, but with my dove-tailed wedges in place, secured by set-screws; and Figs. 5. and 6. represent an enlarged partly sectional elevation of such an universal shaft-coupling joint, showing the dove-tailed wedges in position, secured by set-screws.

Similar letters of reference indicate corresponding parts.

In Fig. 1, $a$ represents the axle of a drive-wheel of a locomotive engine; $b$, the main body of the drive-wheels; $c$, the spokes of the drive-wheel; $d$, the beveled-cog wheel which gears with the pinion, $p$ (Fig. 4.); and $e$, the rim-flange of the beveled-cog wheel, $d$, secured to the main drive-wheel body by means of bolts, $f$. G represents a wedge of steel, approximately 3″ inches in length, 1½″ inches thick, 2″ inches wide at its head, and tapering uniformly on both edges to a width of approximately 1⅜″ inches at its point (but may be of any suitable dimensions), and containing in the center of either edge a dove-tailed groove or channel, of uniform depth, running its entire length. H represents a mortise, one-half of which is sunk in the main drive-wheel body, $b$, and the other half of which is sunk into the flange, $e$, of the beveled-cog gear-wheel, $d$. Said mortise, H, is cut slightly smaller than the double-dovetailed wedge, G, so that the latter may be driven firmly into the former and secured by means of friction and the set-screw, I. Four of these mortises are cut in each wheel, 90 degrees apart (measuring from the center of each mortise), so that when the wheel parts are assembled the eight mortises will form four apertures shaped each to take a double-dovetailed wedge, G.

In Figs. 4., 5. and 6., $j\ j$ are annular plates with four semi-cylindrical grooves, $k$, cut in each plate, as shown in the Shay coupling, so that when said plates are assembled said grooves will form four cylindrical openings, interposed in said plates 90 degrees apart (measuring from their centers), into which openings fit the brass cups or bushings which take the four lugs of the coupling-yokes, L L. G represents the tapered double-dovetailed wedge of appropriate dimensions, similar to those used in securing the bevel-cogged gear-wheel to the main drive-wheel body in Figs. 1., 2. and 3. In securing together the plates $j\ j$, any number of these wedges may be employed. These wedges, as used in the coupling plates, are driven toward the center of the annular coupling plates which they secure together, and are held firmly in place by means of their own friction and by means of set-screws, I. With these wedges, G, in place, in wheel and coupling, all strain is taken off of the bolts, $f$, and they may be dispensed with entirely; but it is thought that my novel device will prove useful as an auxiliary fastening as well.

I claim:

In a locomotive, the combination, with a universal shaft-coupling, having two annular plates, $j$ $j$, containing semi-cylindrical grooves, $k$, suited to take the lugs of coupling-yokes, L L, of tapering dove-tailed wedges, G, and tapering double-dovetailed mortises, H, cut, one-half in each plate, by means of which wedges and mortises, secured firmly, the one in the other, of their own friction, and with set-screws, I, said plates are held firmly in position and prevented from shearing; substantially as herein shown and described.

SYLVESTER A. BARRICKMAN.

Witnesses:
  HARRY L. BARRICKMAN,
  J. J. McCoy.